United States Patent
Bittner

(10) Patent No.: US 11,785,413 B2
(45) Date of Patent: *Oct. 10, 2023

(54) MEDIA CONTENT PLAYBACK BASED ON AN IDENTIFIED GEOLOCATION OF A TARGET VENUE

(71) Applicant: SPOTIFY AB, Stockholm (SE)

(72) Inventor: Rachel Bittner, New York, NY (US)

(73) Assignee: Spotify AB, Stockholm (SE)

( * ) Notice: Subject to any disclaimer, the term of this patent is extended or adjusted under 35 U.S.C. 154(b) by 77 days.

This patent is subject to a terminal disclaimer.

(21) Appl. No.: 17/505,290

(22) Filed: Oct. 19, 2021

(65) Prior Publication Data

US 2022/0150660 A1 May 12, 2022

Related U.S. Application Data

(63) Continuation of application No. 16/989,728, filed on Aug. 10, 2020, now Pat. No. 11,184,732, which is a continuation of application No. 16/209,536, filed on Dec. 4, 2018, now Pat. No. 10,785,591.

(51) Int. Cl.
*H04S 7/00* (2006.01)

(52) U.S. Cl.
CPC .............. *H04S 7/305* (2013.01); *H04S 7/304* (2013.01); *H04S 7/308* (2013.01); *H04S 2400/11* (2013.01); *H04S 2420/01* (2013.01)

(58) Field of Classification Search
CPC .. H04S 2420/01; H04S 2400/11; H04S 7/305; H04S 7/304; H04S 7/308
USPC ........................................................ 381/17
See application file for complete search history.

(56) References Cited

U.S. PATENT DOCUMENTS

| | | | |
|---|---|---|---|
| 8,831,255 B2 | 9/2014 | Crawford et al. |
| 9,338,578 B2 | 5/2016 | Choi |
| 9,787,846 B2 | 10/2017 | Srinivasan et al. |
| 10,785,591 B2 | 9/2020 | Bittner |
| 2003/0053680 A1 | 3/2003 | Lin et al. |
| 2003/0061001 A1 | 3/2003 | Willins et al. |

(Continued)

FOREIGN PATENT DOCUMENTS

| | | |
|---|---|---|
| EP | 2690407 | 1/2014 |
| EP | 3503558 | 6/2019 |
| JP | 2016021169 | 2/2016 |

OTHER PUBLICATIONS

European Communication in Application 19213340, dated Nov. 2, 2020, 6 pages.

(Continued)

*Primary Examiner* — Paul Kim
(74) *Attorney, Agent, or Firm* — Merchant & Gould P.C.

(57) ABSTRACT

Media content playback is based on an identified geographic location of a sound source. A geolocation of a target venue is determined. A first geolocation of a media playback device is determined. An indication that the media playback device is within a threshold distance of the target venue is received. Media content associated with the target venue is transferred to the media playback device, wherein one or more characteristics of the media content are dynamically modified to simulate audio originating from the target device. The one or more characteristics of the media content can include audio content characteristics associated with a timing filter, a loudness filter, and a timbre filter.

20 Claims, 7 Drawing Sheets

(56) References Cited

U.S. PATENT DOCUMENTS

2013/0307934 A1   11/2013  Densham et al.
2015/0304789 A1   10/2015  Babayoff et al.
2017/0214728 A1    7/2017  Chan et al.
2017/0318407 A1*  11/2017  Meister .................. H04S 7/303
2021/0021954 A1    1/2021  Bittner

OTHER PUBLICATIONS

European Summons in Application 19213340, dated Jun. 25, 2021, 7 pages.
European Extended Search Report from corresponding European Application No. 19213340, dated Apr. 23, 2020.
European Minuted of Oral Proceedings in Application 19213340.3, mailed Dec. 14, 2021, 8 pages.
European Decision to Refuse in Application 19213340.3, dated Mar. 30, 2022, 8 pages.

\* cited by examiner

MEDIA CONTENT PLAYBACK BASED ON AN IDENTIFIED GEOLOCATION OF A TARGET VENUE

CROSS-REFERENCE TO RELATED APPLICATION

This application is a continuation of U.S. application Ser. No. 16/989,728, filed on Aug. 10, 2020, which is a continuation of U.S. application Ser. No. 16/209,536, filed on Dec. 4, 2018, U.S. Pat. No. 10,785,591, entitled MEDIA CONTENT PLAYBACK BASED ON AN IDENTIFIED GEOLOCATION OF A TARGET VENUE, the disclosures of which are hereby incorporated by reference in their entireties. To the extent appropriate a claim of priority is made to each of the above-disclosed applications.

BACKGROUND

An almost limitless variety of audio content is available to listeners at the touch of a button, or frequently the input of a voice command, given the presence of countless audio content distributors and services that provide access to that content. Examples of audio content include songs, albums, podcasts, audiobooks, promotional clips, etc. However, audio content is typically only transferred to listeners and their playback devices in a basic two-channel format in which it was originally recorded, without taking into account the playback capabilities of those devices to provide more immersive and interactive listening experiences to audio content consumers.

SUMMARY

In general terms, this disclosure is directed to providing media content to a media playback system in a format that takes advantage of the media playback system's capabilities. In some embodiments, and by non-limiting example, the media playback system plays back media content in such a way that the media content sounds like it is coming from a direction of an identified geolocation of a sound source. An example of a sound source is a target venue, such as a business. Examples of business are described herein, such as a coffee shop or a concert venue. Various aspects are described in this disclosure, which include, but are not limited to, the following aspects.

One aspect is a method for providing media content to a media playback device, the method comprising: determining a geolocation of a target venue; determining a first geolocation of the media playback device; receiving an indication that the media playback device is within a threshold distance of the target venue; and transferring, to the media playback device, media content associated with the target venue, wherein one or more characteristics of the media content are dynamically modified to simulate audio originating from the target venue.

In another aspect, a media server is provided. The media server comprises: a database storing a plurality of songs in both of a three-dimensional format and a non-three-dimensional format; at least one processing device in data communication with the database; and at least one computer readable storage device storing instructions that, when executed by the at least one processing device, cause the media server to: determine a first geolocation of a media playback device from which a request for media content has been received; determine a geolocation of a target venue that is within a threshold distance of the media playback device; determine that the media playback device is connected to headphones; and transfer, to the media playback device, media content in a three-dimensional audio format, the media content being associated with the target venue.

In yet another aspect, a media playback device is provided. The media playback device comprises: a processing device; and at least one non-transitory computer readable storage device storing instructions that when executed by the processing device, cause the media playback device to: provide, to a media server, an indication that the media playback device is connected to headphones; provide, to the media server, a geolocation of the media playback device; provide, to the media server, a direction of travel of the media playback device; and play back media content received from the media server, wherein the media content comprises three-dimensional audio content, and wherein the media content is associated with a target location that is within a threshold distance of the media playback device.

DETAILED DESCRIPTION

Figure 1:
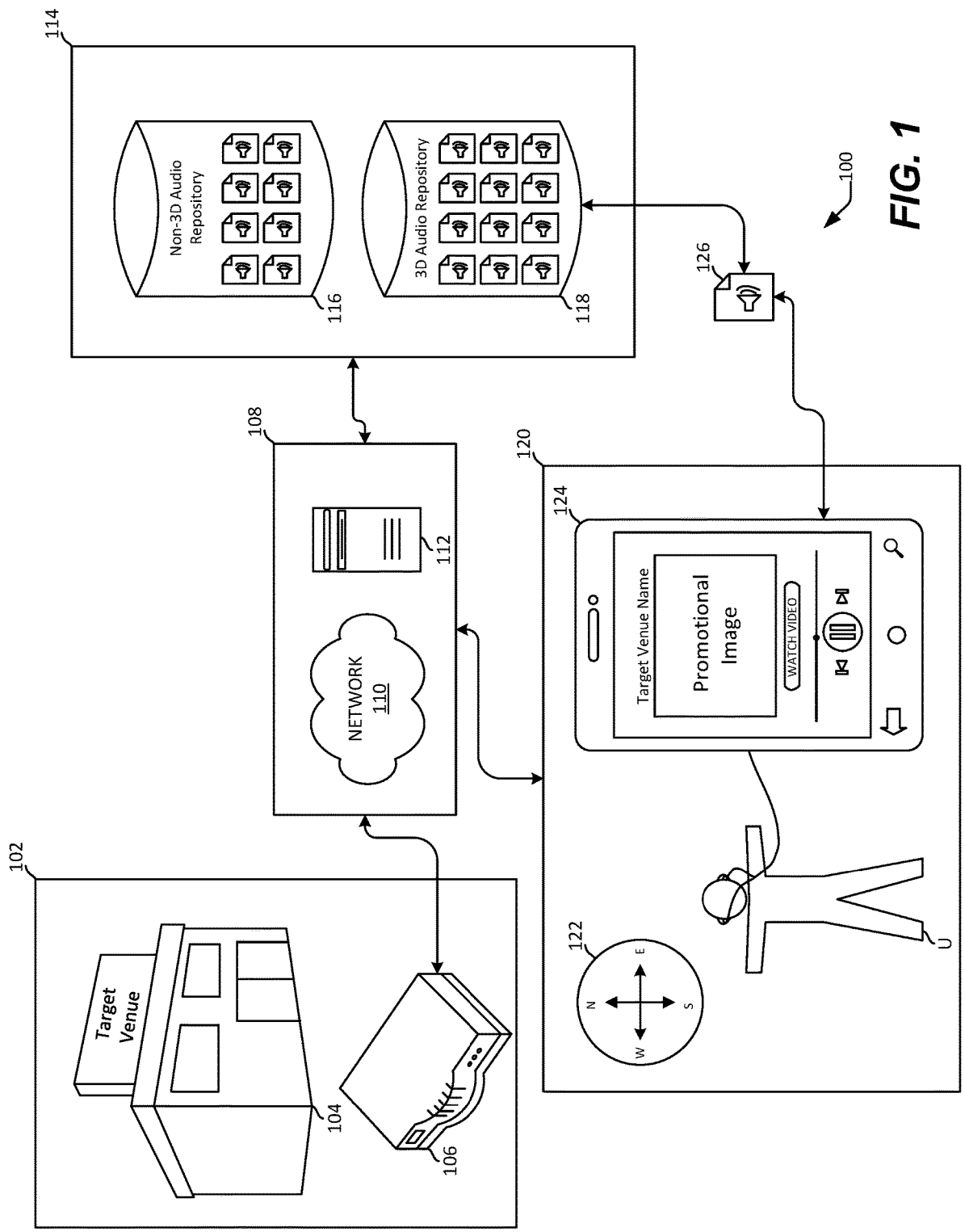
FIG. 1 illustrates an example system for selecting and providing three-dimensional and non-three-dimensional audio content associated with a target venue to a media playback system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The perception of spatial sound in the real world is a complex phenomenon. It combines the interactions between acoustic sound waves and a room or space, the interaction with a listener's head and ears, the reaction of a listener's middle and inner ear and the audio nerve, and the brain's cognition and interpretation of an acoustic scene.

Audio recordings have generally been provided to users, via media playback systems (e.g., speakers and headphones; devices associated with speakers and headphones such as tablets, smart phones, CD players, MP3 players, etc.) in a two-channel stereo format, or a multi-channel surround sound format. During two-channel stereo recording, two microphones are placed in strategically chosen locations relative to a sound source, with both recording simultaneously. The two recorded channels are similar, with each having a distinct time-of-arrival, and pressure-level, associated with received sound. During playback of such recordings, a basic illusion of multi-directional audible perspective is generally achieved by using two independent audio channels through a configuration of two or more speakers (or stereo headphones) in such a way as to create the impression of sound heard from two directions. However, conventional stereo recordings fail to give listeners an accurate perception of the location from which audio content originates from in relation to their physical location because those recordings do not factor in natural ear spacing or "head shadow" of the head and ears, as well as other physical factors associated with receiving and processing sound in a three-dimensional environment, since these things happen naturally as a person listens, generating their own interaural time difference and interaural level differences.

Surround sound systems provide a better locational auditory perception to listeners than typical stereo recordings. Surround sound generally describes a technique for enriching the sound reproduction quality of an audio source with additional audio channels from speakers that surround the listener. Surround sound is characterized by a listener location, or sweet spot, where the audio effects work best, and presents a fixed or forward perspective of the sound field to the listener at this location. The technique enhances a listener's ability to identify the location or origin of a detected sound in direction and distance. Typically this is achieved by using multiple discrete audio channels routed to an array of loud speakers, whereby each source channel is mapped to its own loudspeaker. However, like typical stereo recordings, surround sound also fails to provide an accurate perception of sound as it is heard in everyday life. For example, surround sound is hindered by the fact that there are a finite number of places (i.e., speakers) from which sound can be perceived to originate from, and the sound no longer enters a listener's ears unaltered. Instead, it bounces around objects in a three-dimensional listening environment (e.g., walls, chairs, desks, etc.) that is unlike the environment that the sound has been recorded to capture. As such, the sound reverberates off of objects in the environment, leaving sensitive phase information muddled.

In contrast to typical stereo and surround sound systems, three-dimensional audio systems provide a listener with the perception that they are physically present in a three-dimensional environment where audio is being produced, without limiting the listener to a specific sweet spot, as generally required by surround sound systems. Three-dimensional recording (sometimes called binaural recording) takes the stereo recording method one step further by placing two microphones in ear-like cavities on either side of a stand or dummy head in order to capture and process sound most closely to the way it would be heard by human ears, thereby preserving interaural cues. Three-dimensional audio recordings are capable of providing an accurate perception of sound, as heard in the real world, by capturing sound waves as they are modified by a listener's aural anatomy (e.g., the size and shape of the head, ears, ear canal, density of the head, size and shape of nasal and oral cavities, etc.). Thus, three-dimensional audio recording accurately captures the modified soundwaves as they would be heard by a listener, including pitch, tone, loudness, and location modifications, which are commonly referred to as head related transfer functions and HRTF filters. This allows for a listener of three-dimensional audio content to place and perceive different sounds in different three-dimensional locations upon hearing those sounds, even though the sounds may be produced by just two speakers of a pair of headphones.

Three-dimensional audio content can also be created by simulating the soundwave modifications that would occur in a natural sound environment through the application of HRTF filters to standard multi-channel recordings, in order to attempt to replicate non-altered three dimensional recordings. For example, filters that account for natural sound environment factors may comprise filters that adjust soundwaves based on distance, desired sound origination in relation to a listener, head movement of a listener, direction of travel of a user relative to a sound source, rate of travel of a user relative to a sound source, and a user's aural anatomy, among others. The perceived accuracy of producing such a recording is dependent at least on how much information is available in the original recording (e.g., a multi-track recording with multiple channels can be processed to create a more convincing three-dimensional audio equivalent than a mono-track stereo recording). Such a recording, as referred to herein, is designated as a simulated three-dimensional audio recording, or simulated three-dimensional audio content.

Three-dimensional audio playback can accurately emulate a three-dimensional sound environment when played through headphones. This is typically not the case when a three-dimensional recording is played back by one or more surrounding speakers. For example, when three-dimensional audio recordings are played back through surrounding speakers in a three-dimensional environment, most of the subtlety is lost, and it is difficult to perceive a difference from ordinary stereo sound. Thus, when played over typical surrounding speakers, rather than providing the complex sound visualization of a three-dimensional recording, a listener is instead sensitive to the sound visualization of her three-dimensional environment.

FIG. 1 illustrates an example system 100 for selecting and providing three-dimensional (3D) and non-three-dimensional (non-3D) audio content associated with a target venue to a media playback system. The example system 100 includes target venue environment 102, media content processing and transfer environment 108, audio content storage environment 114, and media playback environment 120.

Media playback environment 120 includes user U and media playback device 124. User U is wearing headphones that are physically connected to media playback device 124, although it should be understood that user U's headphones may be connected/paired to media playback device 124 via wireless communication (e.g., BlueTooth, WiFi, etc.). The media playback device 124 may comprise any device capable of playing back audio content, stored locally on the media playback device 124 or remotely (e.g., audio content stored on one or more remote computing devices associated with a media streaming service, audio content stored on one or more computing devices associated with a media uploading and/or downloading service, audio content stored on one or more remote computing devices associated with a cloud computing storage service, etc.). For example, the media playback device 124 may comprise devices such as a smart phone, a tablet, a laptop, a desktop, an MP3 player, etc., as well as any of those devices in addition to associated audio producing devices (e.g., speakers that are physically or wirelessly connected, headphones that are physically or wirelessly connected, etc.).

Media content processing and transfer environment 108 includes server computing device 112, network 110. Devices associated with target venue environment 102, media content processing and transfer environment 108, audio content storage environment 114, and media playback environment 120, may communicate with one another via network 110.

Audio content storage environment 114 includes 3D audio repository 118, including a plurality of 3D audio tracks, and non-3D audio repository 116, including a plurality of non-3D audio tracks. According to examples, user U may request, via media playback device 124 and network 110, access to one or more audio tracks comprised in one or both of 3D audio repository 118 and non-3D audio repository 116. The request may be input into a graphical user interface, or language processing software associated with, media playback device 124. For example, media playback device 124 may run a media content streaming application, which provides functionality related to selecting and playing media content, including audio content, which may be stored locally on media playback device 124, an associated device, and/or remotely.

The request to access one or more audio tracks, in addition to providing an indication of which audio tracks, files playlists, etc. are requested, may comprise an indication of whether the requesting device and/or a connected device is suitable for playing 3D audio content. For example, a determination may be made by media playback device 124 that headphones are physically connected or wirelessly connected to it, and as such, a further determination may be made that media playback device 124 is connected to a device (the headphones) that is suitable for playing 3D audio content.

According to some examples, the determination of whether a requesting device and/or a connected device is suitable for playing 3D audio may be made by one or more remote computing devices, such as server computing device 112. Thus, in some aspects, media playback device 124 may make the determination of whether it or a connected device is suitable for playing 3D audio, and that information may be transferred to a media server, and in other aspects, media playback device 124 may transfer information about itself and/or other media playback devices associated with it, and a determination of whether it and/or a connected device is suitable for playing 3D audio may be made by one or more remote computing devices, such as server computing device 112.

According to examples, server computing device 112 may comprise a media server and/or a content type selection server. Server computing device 112 may perform one or more operations related to receiving media content requests, determining whether a requesting device or a connected device is suitable for playing 3D audio content, and selecting appropriate media content to transfer to a requesting device, such as media playback device 124.

In some aspects, upon receiving a request for one or more audio tracks from media playback device 124, server computing device 112 may determine, based on information associated with that request, that media playback device 124 is connected to headphones and/or another device that is suitable for playing 3D audio content, and that the media playback system associated with media playback device 124 is therefore suitable for playing 3D audio that will be perceived by a listener as corresponding to a natural sound environment. According to other aspects, that determination may be made based on one or more communications by a media playback system associated with media playback device 124. Accordingly, server computing device 112 may send a request to 3D audio repository 118 for one or more of the audio tracks that were requested by media playback device 124.

Although shown as two remote repositories, 3D audio repository 118 and non-3D audio repository 116 may be maintained jointly on a server computing device, such as server computing device 112. Additionally, although shown as two separate repositories, 3D audio repository 118 and non-3D audio repository 116 may reside on the same or different storage devices.

Upon receiving a request for one or more 3D audio tracks, 3D audio repository 118, or one or more computing devices associated with 3D audio repository 118, may transfer one or more of the requested audio tracks to media playback device 124. Thus, in exemplary system 100, 3D audio content 126 is sent to media playback device 124, via network 110. According to other examples, 3D audio repository 118 may transfer one or more of the requested 3D audio tracks to one or more intermediary computing devices, such as server computing device 112, and subsequently transferred to media playback device 124.

In some examples, rather than transferring 3D audio tracks from 3D audio repository 118 to media playback device 124, requested audio tracks may be transferred from non-3D audio repository 116 to one or more HRTF processing engines and one or more associated computing devices, such as server computing device 112, which may apply one or more HRTF filters to the requested audio tracks, thereby generating simulated 3D audio tracks that are then transferred to media playback device 124. Similarly, rather than transferring 3D audio tracks from 3D audio repository 118 to media playback device 124 and/or applying one or more HRTF filters to the requested audio tracks at one or more HRTF processing computing devices prior to transferring simulated 3D audio tracks to media playback device, requested audio tracks may be transferred from non-3D audio repository 116 to media playback device 124, which may subsequently apply one or more HRTF filters to the requested audio tracks, thereby generating simulated 3D audio tracks at media playback device 124.

According to some examples, one or more movement-determining devices may be physically and/or wirelessly connected to an audio requesting device, such as media playback device 124. For example, headphones connected to media playback device 124 may comprise one or more accelerometer for detecting a change in location. Thus, when connected to media playback device 124, and worn on user U, headphones comprising one or more accelerometer may provide an indication to media playback device 124, and/or one or more remote computing devices (e.g., server computing device 112), regarding user U's head position and movement. As such, when 3D audio content is being played by media playback device 124 in such a scenario, one or more filters may be applied to the 3D audio content at media playback device 124 and/or one or more remote computing devices (e.g., server computing device 112) to compensate for a determined change in user U's head location. For example, one or more HRTF filters may be automatically applied to 3D audio content being played by media playback device 124 when a change in user U's head location is determined to have occurred, such that the 3D audio content being played provides an accurate perception of what the audio being played would sound like if user U were present and moving her head, and the 3D audio was naturally originating from target venue 104. According to examples, compensating filters that may be applied in such a scenario may include one or more of: a timing filter, a loudness filter, and a timbre filter.

Although the examples described herein use accelerometers, in other embodiments other types of movement-determining devices are used. Movement-determining devices are depicted generically in media playback environment 120 as movement determining device 122. A movement-determining device is a device that operates to capture measurements related to movement of the media playback device 124 and/or an associated device (e.g., headphones, a headband, virtual reality headgear, etc.). An accelerometer is an example of a movement-determining device.

An accelerometer is a device that is used to measure acceleration, including gravitational acceleration. In some embodiments, an accelerometer measures acceleration in a single direction. In other embodiments, an accelerometer measures acceleration in more than one direction, such as in three directions. In some embodiments, the orientation of an accelerometer is inferred by comparing the measured direction and magnitude of acceleration to an expected direction and magnitude of gravitational acceleration. Additionally, in some embodiments, the movement of one or more accelerometers and/or a user's head may be inferred from one or more measured acceleration values.

In some examples, a set of accelerometers may be implemented in determining a change in a user's head location. For example, an X accelerometer, a Y accelerometer, and a Z accelerometer may be implemented. In such examples, an X accelerometer may operate to measure acceleration in the horizontal direction relative to a user's head location, a Y accelerometer may operate to measure acceleration in a vertical direction relative to a user's head location, and a Z accelerometer may operate to measure acceleration in a front-to-back direction relative to a user's head location. In some embodiments, an accelerometer set may be implemented that includes three or more accelerometers that each operate to measure acceleration in three orthogonal directions (i.e., each of the three directions is pairwise perpendicular to the other two directions). In this manner one or more accelerometers may operate to determine and/or provide data such that a determination can be reached regarding acceleration in three-dimensional space.

Target venue environment 102 includes target venue 104 and router computing device 106. Target venue 104 comprises a physical entity, such as a brick and mortar place of interest, a business, a sporting venue, a school, a company, etc. In some examples, information about target venue 104 may be stored on a computing device that is in communication with one or more media content application servers, such as server computing device 112. Such information about target venue 104 may include: a geographic location of target venue 104, the type of entity that target venue 104 corresponds to (e.g., a coffee shop, a retail shop, a sport venue, a concert venue, etc.), and one or more types of goods or services that are offered in association with target venue 104. In some examples, one or more audio and/or video promotional tracks associated with target venue 104 may be stored in one or more repositories, such as non-3D audio repository 116 and/or 3D audio repository 118.

According to some aspects, a determination may be made that a media playback device associated with a media playback service, such as media playback device 124, is within a threshold distance of target venue 104 (e.g., one-hundred meters, three-hundred meters, half a kilometer, two kilometers, etc.), and an indication to transfer media content associated with the target venue to media playback device 124 may be provided based on media playback device 124 being within the threshold distance of target venue 104.

In some examples, if a determination is made that media playback device 124 and/or a connected playback device, such as headphones, is suitable for playing 3D audio content, and an indication has been received that media playback device 124 is within a threshold distance of target venue 104, 3D audio content associated with target venue 104 may be transferred to media playback device 124.

According to additional examples, the 3D audio content associated with target venue 104 may be transferred to media playback device 124 such that it may be perceived by user U as originating from the geographic location of target venue 104. For example, one or more directional and/or loudness HRTF filters may be applied to the 3D audio content associated with target venue 104 such that the 3D audio content is perceived to originate from the geographic location of target venue 104 in relation to media playback device 124. For example, a geolocation of media playback device 124 may be received, a geolocation of target venue 104 may be received, and one or more HRTF filters may be applied to the 3D audio content associated with target venue 104 such that the 3D audio content is perceived to originate from the geographic location of target venue 104 in relation to the received geolocation of media playback device 124. In additional examples, the geolocation of media playback device 124 may be received at timed intervals and/or the geolocation of media playback device 124 may be updated when a determination that media playback device 124 has moved, and one or more HRTF filters may be modified such that 3D audio content associated with target venue 104 being transferred to media playback device 124 may continue to be perceived by listening user U as originating from target venue 104 as media playback device 124 moves.

In some aspects, where media playback device 124 is connected to headphones that comprise one or more movement-detection devices (e.g., accelerometers), one or more HRTF filters applied to 3D audio content associated with target venue 104 that is being transferred to media playback device 124 may be automatically adjusted in response to receiving an indication that a change in the headphone's location has occurred, such that the 3D audio content may still be perceived by user U as originating from target venue 104. In some examples, the one or more HRTF filters that are automatically adjusted in response to a received indication that a change in the headphone's location has occurred may comprise one or more of: a timing filter, a loudness filter, and a timbre filter. In additional example, user U's head movement may be tracked, and associated HRTF filters applied, based on received video tracking signals, radio wave signals, etc.

According to some examples, the geolocation of target venue 104 may be received and/or determined from a geo-mapping service. For example, entity location data associated with one or more entities (e.g., target venues) within a threshold distance of media playback device 124 may be obtained from a geo-mapping service. That is, when the geolocation of media playback device 124 is received, a geo-mapping service may be queried to determine whether there are one or more entities within a threshold distance of media playback device 124 that correspond to target venues for which promotional audio content is accessible by a media streaming application on media playback device 124.

In some examples, a determination may be made that media playback device 124 is within a threshold distance of target venue 104 for transferring audio content associated with target venue 104 to media playback device 124 based on media playback device 124 receiving a wireless signal from router computing device 106 (e.g., media playback device 124 is close enough to router computing device 106 to receive and analyze a wireless signal from router computing device 106). In some examples, a received wireless signal received by media playback device 124 from router computing device 106 may comprise one or more of: a geographic location of target venue 104, the type of entity that target venue 104 corresponds to (e.g., a coffee shop, a retail shop, a sport venue, a concert venue, etc.), one or more types of goods or services that are offered in association with target venue 104, and/or an indication that one or more audio and/or video promotional tracks associated with target venue 104 may be stored in one or more repositories, such as non-3D audio repository 116 and/or 3D audio repository 118 for streaming to media playback device 124.

Figure 2:
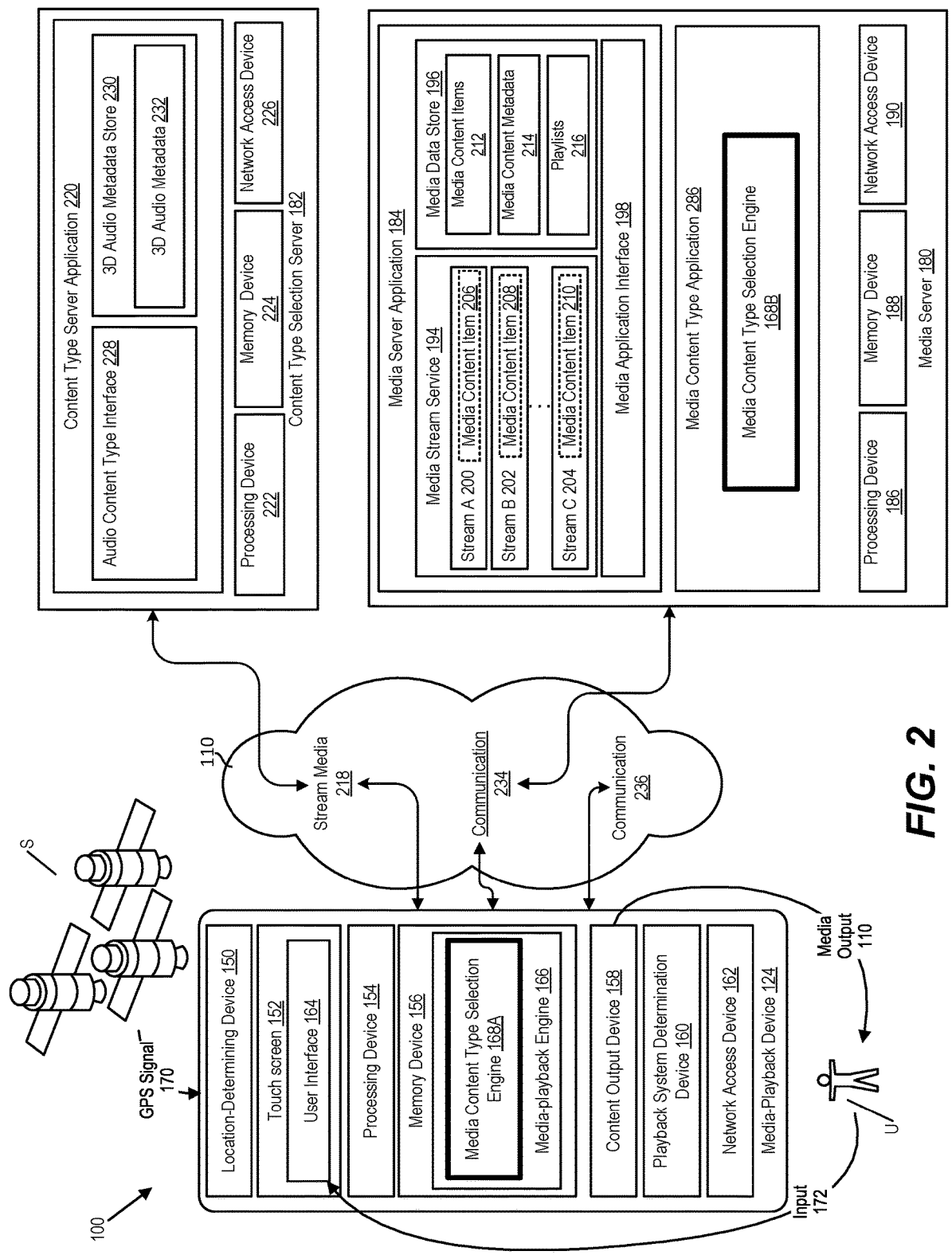
FIG. 2 is a schematic illustration of the example system of FIG. 1 for selecting and providing three-dimensional and non-three dimensional audio content associated with a target venue to a media playback system.

FIG. 2 is a schematic illustration of the example system 100 of FIG. 1 for selecting and providing three-dimensional and non-three-dimensional audio content associated with a target venue to a media playback system. In FIG. 2, the media playback device 124, server computing device 112 (including media server 180 and content type selection server 182), and the network 110 are shown. Also shown are the user U and satellites S.

As noted above, the media playback device 124 and/or one or more connected devices operate to play media content comprising 3D audio content and non-3D audio content. In some embodiments, the media playback device 124 operates to play media content items that are provided (e.g., streamed, transmitted, etc.) by a system external to the media playback device 124 such as media server 180 and/or content type selection server 182, another system, or a peer device, which may be comprised of server computing device 112. Alternatively, in some embodiments, the media playback device 124 operates to play media content stored locally on the media playback device 124. Further, in at least some embodiments, the media playback device 124 operates to play media content that is stored locally as well as media content provided by other systems and devices.

In some embodiments, the media playback device 124 is a computing device, handheld entertainment device, smartphone, tablet, watch, wearable device, or any other type of device capable of playing media content. In yet other embodiments, the media playback device 124 is a laptop computer, desktop computer, television, gaming console, set-top box, network appliance, blue-ray or DVD player, media player, stereo, or radio. In some examples the media playback device 124 may be connected, physically and/or wirelessly, to one or more audio producing devices such as one or more speakers.

In at least some embodiments, the media playback device 124 includes a location-determining device 150, a touch screen 152, a processing device 154, a memory device 156, a content output device 158, a playback system determination device 160, and a network access device 162. Other embodiments may include additional, different, or fewer components. For example, some embodiments may include a recording device such as a microphone or camera that operates to record audio or video content. As another example, some embodiments do not include one or more of the location-determining device 150 and the touch screen 152.

The location-determining device 150 is a device that determines the location of the media playback device 124. In some embodiments, the location-determining device 150 uses one or more of the following technologies: Global Positioning System (GPS) technology which may receive GPS signals 170 from satellites S, cellular triangulation technology, network-based location identification technology, WiFi positioning systems technology, and combinations thereof.

The touch screen 152 operates to receive an input 172 from a selector (e.g., a finger, stylus etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 164 for interacting with the media playback device 124. As noted above, some embodiments do not include a touch screen 152. Some embodiments include a display device and one or more separate user interface devices. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media-playback engine 166 that includes a media content type selection engine 168A. In some embodiments, the media-playback engine 166 operates to play back media content and the media content type selection engine 168A operates to track the geolocation of media playback device 124, determine whether one or more target venues are within a threshold distance of media playback device 124, select audio content associated with one or more target venues to transfer to media playback device 124, and/or apply one or more HRTF filters to audio content that is being played back or that is stored for future playback. For example, if media playback device 124 or an associated device are determined to be suitable for 3D audio playback, but audio content that is being played back by the media playback device 124, or that is stored on media playback device 124 for future playback, is not in a 3D format, media content type selection engine 168A may apply one or more HRTF filters to one or more corresponding non-3D audio tracks in order to play those tracks in a 3D audio format. Additionally, media content type selection engine 168A may receive an indication that user U's head position has changed (e.g., receive information from or related to movement detection devices connected to media playback device 124), and apply one or more HRTF filters to one or more 3D audio tracks (e.g., 3D audio tracks associated with a target venue that is determined to be within a threshold distance of media playback device 124) prior to or during playback of those tracks by the media playback device 124.

The memory device 156 typically includes at least some form of computer-readable media. Computer readable media includes any available media that can be accessed by the media playback device 124. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media playback device 124. In some embodiments, computer readable storage media is non-transitory computer readable storage media.

Computer readable communication media as described herein embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output for the user U. Examples of the content output device 158 include a speaker, an audio output jack, a Bluetooth transmitter, a display panel, and a video output jack. Other embodiments are possible as well. For example, the content output device 158 may transmit a signal through the audio output jack or Bluetooth transmitter that can be used to reproduce an audio signal by a connected or paired device such as headphones or a speaker.

The playback system determination device 160 operates to determine whether the media playback device 124, or a connected device, is suitable for playing back 3D audio content. In some examples, the playback system determination device 160 may send an indication of whether the media playback device 124 or a connected device is suitable for playing back 3D audio content to a media content server (e.g., server computing device 112). In at least some examples, the playback system determination device 160 operates to determine whether headphones are physically or wirelessly connected to media playback device 124, and thus suitable for playing back 3D audio content. In other examples, the playback system determination device 160 operates to determine whether a user has provided input into media playback device 124, or a device connected to media playback device 124, indicating that media playback device 124 is or is not suitable for playing back 3D audio.

The network access device 162 operates to communicate with other computing devices over one or more networks, such as network 110. Examples of the network access device include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

The network 110 is an electronic communication network that facilitates communication between the media playback device 124 and remote devices associated with media content selection, processing, and delivery, including content type selection server 182, media server 180, and the devices depicted in the various environments of FIG. 1. An electronic communication network includes a set of computing devices and links between the computing devices. The computing devices in the network 110 use the links to enable communication among the computing devices in the network 110. The network 110 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 110 includes various types of links. For example, the network 110 can include wired and/or wireless links, including Bluetooth, ultrawideband (UWB), 802.11, ZigBee, cellular, and other types of wireless links. Furthermore, in various embodiments, the network 110 is implemented at various scales. For example, the network 110 can be implemented as one or more local area networks (LANs), metropolitan area networks, subnets, wide area networks (such as the Internet), or can be implemented at another scale. Further, in some embodiments, the network 110 includes multiple networks, which may be of the same type or of multiple different types.

In at least some embodiments, the media server 180 and the content type selection server 182 are provided by separate computing devices. In other embodiments, the media server 180 and the content type selection server 182 are provided by the same computing devices. Further, in some embodiments, one or both of the media server 180 and the content type selection server 182 are provided by multiple computing devices. For example, the media server 180 and the content type selection server 182 may be provided by multiple redundant servers located in multiple geographic locations.

The media server 180 operates to transmit stream media 218 to media-playback devices such as the media playback device 124. In some embodiments, the media server 180 includes a media server application 184, a media content type selection engine 168B, a processing device 186, a memory device 188, and a network access device 190. The processing device 186, memory device 188, and network access device 190 may be similar to the processing device 154, memory device 156, and network access device 162 respectively, which have each been previously described.

In some embodiments, the media server application 184 operates to stream music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media playback devices or other systems, to retrieve media content items from the media server 180. For example, in FIG. 2, the media application interface 198 receives communication 234 from the media playback device 124.

In some embodiments, the media data store 196 stores media content items 212, media content metadata 214, and playlists 216. The media data store 196 may comprise one or more databases and file systems (e.g., 3D audio repository 128, non-3D audio repository 130, etc.). Other embodiments are possible as well. As noted above, the media content items 212 may be audio, video, or any other type of media content, which may be stored in any format for storing media content.

Media content items 206, 208, and 210 may comprise 3D audio content items or non-3D audio content items. For example, one or more of media content items 206, 208 and 210 may be stored in 3D audio repository 128 and comprise 3D audio content as discussed above. Similarly, one or more of media content items 206, 208 and 210 may be stored in non-3D audio repository 130 and comprise non-3D audio content as also discussed above.

The memory device 188 operates to store data and instructions. In some embodiments, the memory device 188 stores instructions for a media content type application that includes a media content type selection engine 168B. In some embodiments, the media content type application 286 receives communications from the media playback device 124 and/or the content type selection server regarding requested media content and/or content associated with one or more target venues that are determined to be within a threshold playback distance of media playback device 124, and the media content type selection engine 168B operates to apply one or more HRTF filters to audio content, determine the geolocation of media playback device 124, and/or determine whether one or more target venues are within a threshold distance of media playback device 124. For example, if a determination is made that media playback device 124 has requested one or more audio tracks and/or media playback device 124 is determined to be within a threshold distance of one or more target venues, and media playback device or an associated device is suitable for playing 3D audio, but that one or more of the requested audio tracks is not stored in a 3D format (e.g., stored in media data store 196 in a 3D format), media content type selection engine 168B may apply one or more HRTF filters to one or more corresponding non-3D audio tracks in order to transfer and/or stream those audio tracks to the media playback device 124 in a 3D audio format. Additionally, media content type selection engine 168 may receive an indication that user U's head position has changed, and apply one or more HRTF filters to one or more 3D audio tracks prior to or during transfer and/or streaming of those tracks to the media playback device 124 such that user U may perceive the 3D audio being transferred and/or streamed to media playback device 124 as originating from a target venue that is within a threshold distance of media playback device 124.

The media content metadata 214 operates to provide various information associated with the media content items 212. In some embodiments, the media content metadata 214 includes one or more of title, artist name, album name, length, genre, mood, era, etc. In other embodiments, the media content metadata 214 may comprise one or more of: a geolocation of an associated target venue, a type of entity that an associated target venue corresponds to, a good or service that is offered by an associated target venue, etc. The playlists 216 operate to identify one or more of the media content items 212 and. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era.

The content type selection server 182 operates to provide audio content type-specific information about media content items to media-playback devices. In some embodiments, the content type selection server 182 includes a content type server application 220, a processing device 222, a memory device 224, and a network access device 226. The processing device 222, memory device 224, and network access device 226 may be similar to the processing device 154, memory device 156, and network access device 162 respectively, which have each been previously described.

In some embodiments, content type server application 220 operates to analyze a request for audio content from media playback device 124 and/or content associated with one or more target venues that are determined to be within a threshold playback distance of media playback device 124, and determine, based on one or more factors, whether media playback device 124 is suitable for playing 3D audio content. The content type server application 220 includes a 3D audio content type interface 228, and a 3D audio metadata store 230.

The audio content type interface 228 operates to receive requests or other communication from media playback devices or other systems. For example, the audio content type interface 228 may receive communication from the media-playback engine 166. Such requests and communications may include an indication that a requesting device is suitable, or is not suitable, for playing 3D audio content. The audio content type interface 228 may also analyze requests for audio content from media playback devices and retrieve information about requested audio content items from the content type selection server and/or the media server 180. For example, upon making a determination that a requesting media playback device (or a connected device) is suitable for 3D audio content playback, and/or making a determination that a media playback device is within a threshold distance of one or more target venues, the audio content type interface 228 may determine whether one or more requested audio tracks and/or promotional audio tracks associated with the one or more target venues, are available in a 3D format for transfer back to the requesting media playback device.

In some embodiments, the 3D audio metadata store 230 stores 3D audio metadata 232. The 3D audio metadata store 230 may comprise one or more databases and file systems. Other embodiments are possible as well.

The 3D audio metadata 232 operates to provide various information associated with media content items, such as the media content items 212. In some embodiments, the 3D audio metadata 232 provides information that may be useful for selecting media content items for playback by a media playback device or an associated device that is determined to be suitable for playing 3D audio content. For example, in some embodiments, the 3D audio metadata 232 stores information related to whether specific media content items are available for transfer back to a media playback device as 3D audio. According to some embodiments, the 3D audio metadata 232 may provide an indication that specific audio content in the media data store 196 is maintained in a 3D audio format. In other embodiments, the 3D audio metadata 232 may provide an indication that specific audio content in the media data store 196 is not maintained in a 3D audio format. In still other embodiments, the 3D audio metadata 232 may provide an indication that a specific audio track in the media data store 196, although not stored in a 3D audio format, may be streamed or otherwise transferred to a media playback device in a 3D audio format after one or more HRTF filters have been applied to it. According to yet other embodiments, the 3D audio metadata 232 may provide an indication that certain portions of a specific audio content in the media data store 196 are maintained in a 3D audio format, while other portions are not. The 3D audio metadata 232 may also provide an indication of the size of specific audio content, in both its 3D audio format and its non-3D audio format.

Each of the media playback device 124, the media server 180, and the content type selection server 182 may include additional physical computer or hardware resources. In at least some embodiments, the media playback device 124 communicates with the media server 180 and the content type selection server 182 via network 110.

Although in FIG. 2 only a single media playback device 124, a single media server 180, and a single content type selection server 182, are shown, in accordance with some embodiments, the media server 180 and the content type selection server 182 can support a plurality of media playback devices and associated communications and requests, and the media playback device 124 can simultaneously access media content from a plurality of media servers and content type selection servers. Additionally, although FIG. 2 illustrates a streaming media-based system for media content selection, other embodiments are possible as well. For example, in some embodiments, the media playback device 124 includes a media data store 196 (i.e., media content that is stored locally on the media playback device 124) and the media playback device 124 is configured to perform media content selection and/or HRTF filtering. Further in some embodiments, the media playback device 124 may operate to store previously streamed media content items in a local media data store.

In at least some embodiments, one, both, or the combination of the media server 180 and the content type selection server 182, can be used to stream, progressively download, or otherwise communicate music, other audio, video, or other forms of media content items to the media playback device 124 based on a request for media content, receiving an indication and/or otherwise determining that one or more target venues are within a threshold distance of media playback device 124, and/or a communicated indication of whether the media playback device 124 or an associated/connected device is suitable for playing 3D audio content.

In accordance with an embodiment, a user U can direct the input 172 to the user interface 164 to issue requests, for example, to playback media content corresponding to one or more audio tracks and/or a format in which such requested tracks are desired (e.g., 3D audio format, non-3D audio format). For example, although the media playback device 124 or an associated device (e.g., connected headphones) may be suitable for playing 3D audio, user U may nonetheless request that non-3D audio formatted tracks be requested and transferred to media playback device 124 due to factors such as network streaming speeds, network streaming costs, and available storage on the media playback device 124, among others.

Figure 3:
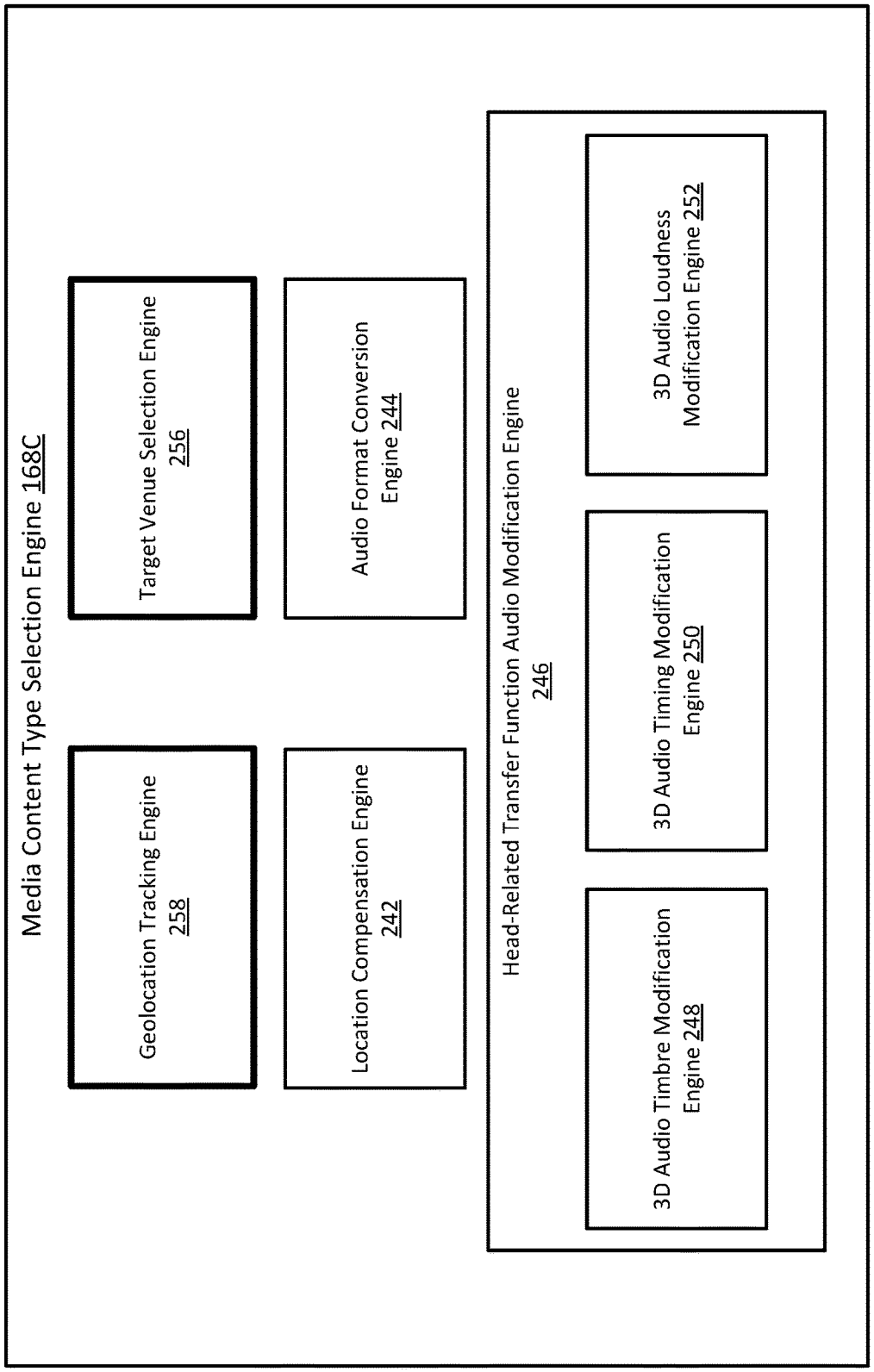
FIG. 3 is a schematic block diagram of the media content selection engine shown in FIG. 2.

FIG. 3 is a schematic block diagram of the media content type selection engine 168C, which may reside in media playback device 124 (i.e., media content type selection engine 168A), media server 180 (i.e., media content type selection engine 168B), or both media playback device 124 and media server 180. Media content type selection engine 168C includes geolocation tracking engine 258, target venue selection engine 256, location compensation engine 242, audio format conversion engine 244, head-related transfer function audio modification engine 246, 3D audio timbre modification engine 248, 3D audio timing modification engine 250, and 3D audio loudness modification engine 252.

According to some embodiments, media content type selection engine 168C may include more or fewer engines related to tracking the geolocation of a media playback device, tracking the direction of travel of a media playback device, tracking the rate of travel of a media playback device, tracking the head location relative to a connected playback device associated with a media playback device, determining whether one or more target venues are within a threshold distance of a media playback device, determining whether one or more target venues within a threshold distance of a media playback device are most suitable for transferring associated media content to a media playback device, and/or location compensation and/or audio format conversion.

In additional embodiments, one or more of the engines shown in media content type selection engine 168C may be comprised within media playback device 124, while the same or different engines shown in media content type selection engine 168C may be comprised within media server 180. In other embodiments, one or more of the engines shown in media content type selection engine 168C may be comprised within a computing device other than media playback device 124 and media server 180.

Geolocation tracking engine 258 may perform one or more operations related to: determining a geolocation of media playback device 124, determining a direction of travel of media playback device 124, analyzing one or more timestamps associated with received geolocations of media playback device 124, calculating, based on received timestamps associated with geolocations of media playback device 124, a direction of travel of a media playback device 124, and/or determining that a direction of travel of media playback device 124 has changed.

Target venue selection engine 256 may perform one or more operations related to: determining that media playback device 124 is within a threshold distance of a target venue, determining that a target venue that is within a threshold distance of media playback device 124 corresponds to one or more entity types, determining that a target venue that is within a threshold distance of media playback device 124 offers one or more specific types of goods or services, querying a geographic mapping service to determine whether there are one or more target venues with a threshold distance of media playback device 124, and/or ranking the relevance of one or more target venues (or target venue promotional media content tracks) that are within a threshold distance of media playback device 124. According to some examples, the ranking may be based on a relative match of a target venue's significance to a user based on that user's listening history, location history, and demographic data associated with that user, based on past user data associated with one or more applications and/or web browsing data associated with that user.

Location compensation engine 242 may perform one or more operations related to receiving location and movement information associated with one or more devices located on or near a user that is listening to audio content played by the media playback device 124, and determining whether one or more HRTF filters should be applied or modified in relation to 3D audio content being played. For example, location compensation engine 242 may receive location and movement information from headphones connected to the media playback device 124 (e.g., accelerometer information), determining from that information that a user's head location has changed, and as such, determining that one or more compensating HRTF filters should be applied or modified with regard to 3D audio content being played by the media playback device 124.

Location compensation engine 242 may additionally or alternatively perform one or more operations related to receiving location and movement information associated with media playback device 124, and determining whether one or more HRTF filters should be applied or modified in relation to 3D audio content associated with a target venue that is being played by media playback device 124. For example, location compensation engine 242 may receive location and movement information associated with media playback device 124 in relation to one or more target venues, and determine whether one or more HRTF filters should be applied or modified with regard to 3D audio content associated with one or more target venues that media playback device 124 is within a threshold distance of such that a user may perceive that 3D audio as originating from the one or more target locations.

Audio format conversion engine 244, when comprised within the media playback device 124, may perform one or more operations related to determining that one or more audio tracks being played back or stored by the media playback device 124 are in a non-3D format, determining that media playback device 124 or an associated device is suitable for playing 3D audio content, and determining that one or more HRTF filters should be applied to the one or more audio tracks to convert them from a non-3D audio format to a simulated 3D audio format and/or 3D audio originating from a target venue that media playback device 124 is within a threshold distance of. Similarly, audio format conversion engine 244, when comprised within a remote computing device such as media server 180, may perform one or more operations related to determining that one or more audio tracks being transferred, streamed, or requested, by the media playback device 124 are stored in a non-3D format, determining or receiving a determination that media playback device 124 or an associated device is suitable for playing 3D audio content, and determining that one or more HRTF filters should be applied to the one or more audio tracks to convert them from a non-3D audio format to a simulated 3D audio format, and/or simulate 3D audio format that originates from a target venue that media playback device 124 is determined to be within a threshold distance of.

Head-related transfer function audio modification engine 246 comprises 3D audio timbre modification engine 248, 3D audio timing modification engine 250, and 3D audio loudness modification engine 252. According to examples, head-related transfer function audio modification engine 246 may receive an indication from location compensation engine 242 that one or more HRTF filters should be applied to 3D audio content currently being played, streamed or otherwise transferred to the media playback device 124. That indication may be analyzed by head-related transfer function audio modification engine 246 and a determination may be made as to whether one or more channels of the 3D audio content should be processed by one or more of the 3D audio timbre modification engine 248, the 3D audio timing modification engine 250, and the 3D audio loudness modification engine 252, in order to compensate for one or more of: detected user head movement (e.g., detected head movement as determined from movement/accelerometer sensors in headphones connected to the media playback device 124), the geolocation of media playback device 124 in relation to a geolocation of a target venue that media playback device 124 is determined to be within a threshold distance of, a direction and/or rate of travel in a direction relative to a geolocation of a target venue that media playback device 124 is determined to be within a threshold distance of.

In some examples, a determination may be made that one or more channels of the 3D audio content should be processed by the 3D audio timbre modification engine 248 because the head (as well as other body parts) deflect sound in different manners based on where sound originates from, and the head's location relative to, that origination point (e.g., a target venue's geolocation), and thus the sound's frequency spectrum from one side of the head to the other is modified based on a user's head movement in relation to a target venue. Thus, a determination may be made to modify one or more channels and their corresponding frequencies in order to change the timbre of the 3D audio content, thereby compensating for a perceived frequency change relative to a user's head movement. Such a modification may be achieved via processing of one or more channels of the 3D audio content by the 3D audio timbre modification engine.

In other examples, a determination may be made that one or more channels of the 3D audio content should be processed by the 3D audio timing modification engine 250 because, for example, sound originating from the left arrives first to the left ear and microseconds later to the right ear. Thus, a determination may be made to modify one or more channels and their corresponding timing, thereby compensating for a perceived timing change relative to a user's head movement and/or the movement of a user (as that movement relates to the geolocation of media playback device 124 in relation to a target venue that is determined to be within a threshold distance of media playback device 124). Such a modification may be achieved via processing of one or more channels of the 3D audio content by the 3D audio timing modification engine 250.

In additional examples, a determination may be made that one or more channels of the 3D audio content should be processed by the 3D audio loudness modification engine 252 because the head muffles sound. For example, sound originating from the left side of a user's head is perceived to be louder to the left ear than to the right ear. Thus, a determination may be made to modify one or more channels and their corresponding loudness, thereby compensating for a perceived loudness change relative to a user's head movement and/or the movement of a user (as that movement relates to the geolocation of media playback device 124 in relation to a target venue that is determined to be within a threshold distance of media playback device 124). Such a modification may be achieved via processing of one or more channels of the 3D audio content by the 3D audio loudness modification engine 252.

Figure 4:
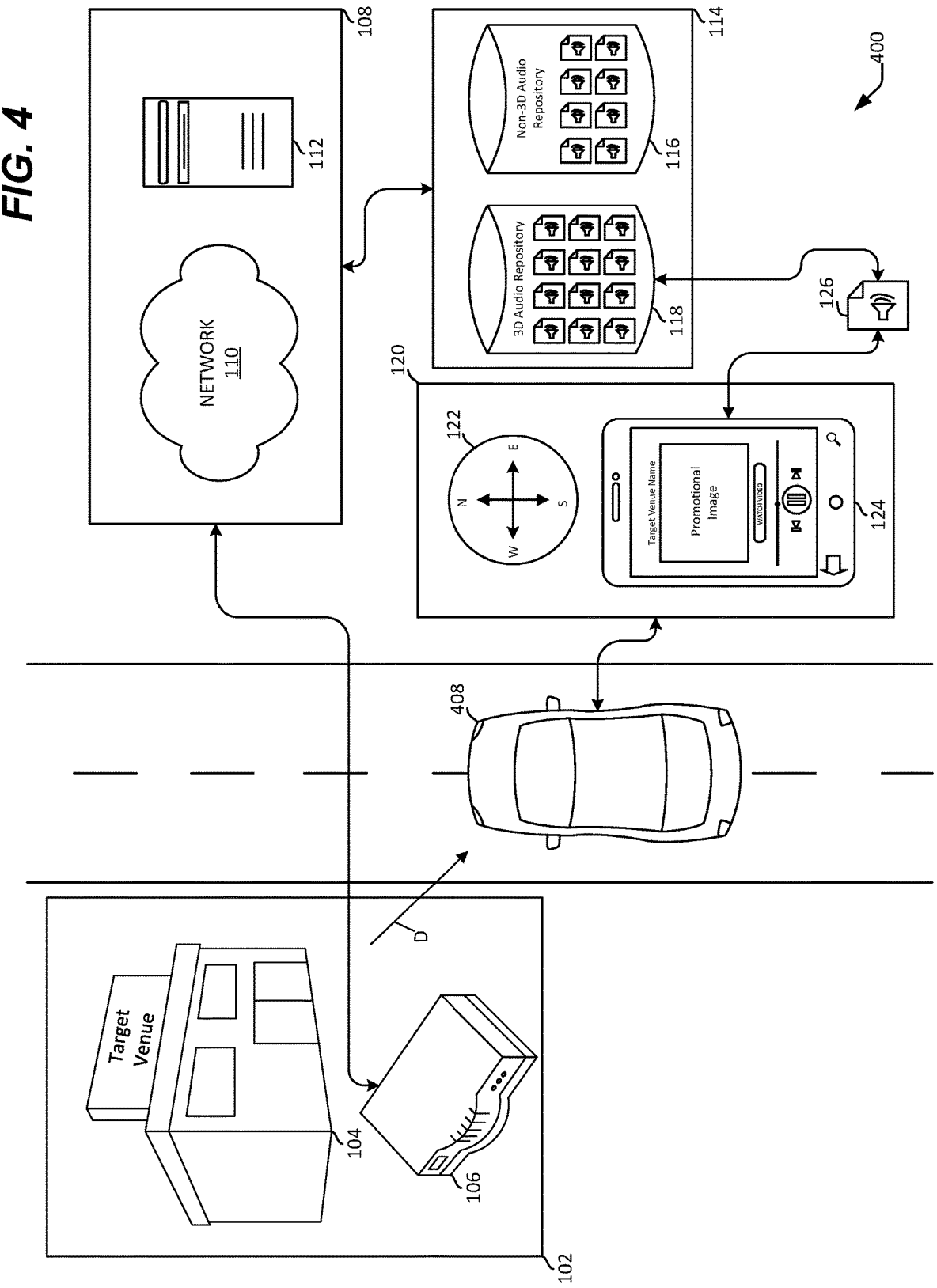
FIG. 4 illustrates an example system for selecting audio content associated with a target venue, providing audio content associated with a target venue, and modifying one or more qualities of audio content associated with a target venue based on the movement of a media playback device as that movement relates to the geolocation of a target venue.

FIG. 4 illustrates an example system 400 for selecting audio content associated with a target venue, providing audio content associated with a target venue, and modifying one or more qualities and/or filters applied to audio content associated with a target venue based on the movement of a media playback device as that movement relates to the geolocation of a target venue.

The example system includes target venue environment 102, media content processing and transfer environment 108, automobile 408, audio content storage environment 114, and media playback environment 120.

Media playback environment 120 includes media playback device 124 and movement determining device 122, each of which may be integrated with automobile 408. According to examples, one or more timestamped geographic locations of media playback device 124 may be received by server computing device 112, such that the direction and rate of travel of automobile 408 may be determined relative to target venue 104. According to some examples server computing device may determine that a threshold distance for providing audio content associated with target venue 104 to media playback device 124 has been met or exceeded based on the rate and direction of automobile 408 relative to target venue 104. In such an example, a further determination may be made that one or more media content providing services associated with media playback device 124 have access to promotional audio content associated with target venue 104 (e.g., audio 3D audio content stored in 3D audio repository 118), and that 3D audio content may be transferred, via network 110, to media playback device 124.

According to some examples, the rate and direction of travel of automobile 408 (and associated media playback device 124) in relation to target venue 104 may be analyzed by server computing device 112, and one or more HRTF filters may be applied and/or modified to promotional 3D audio content transferred to media playback device 124 such that a user in automobile 408 will perceive that audio content as originating from target venue 104. In other words, the media playback device 124 plays the media content item to the user so that it sounds like it is coming from the direction D from the target venue, to the media playback device 124.

Figure 5:
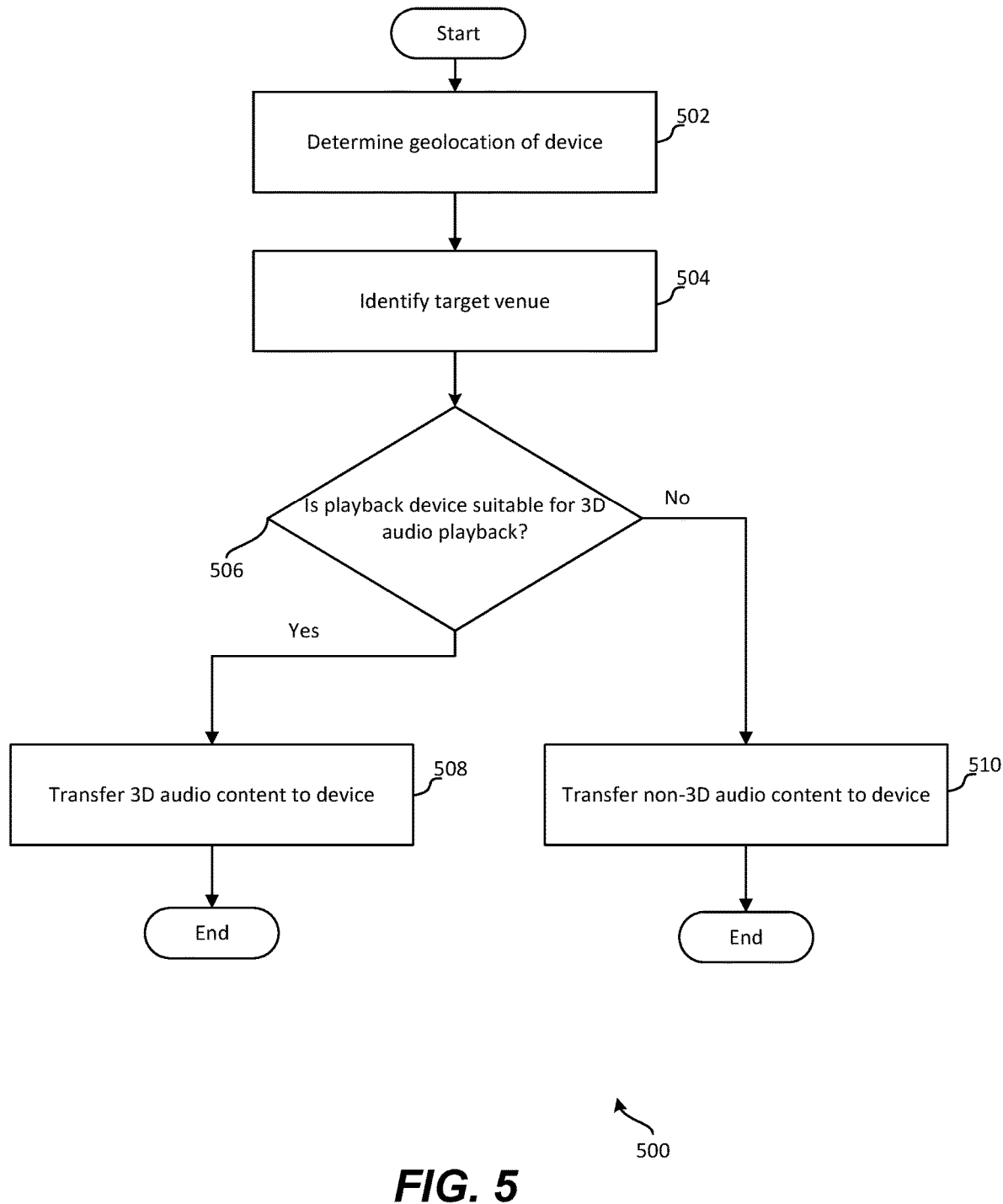
FIG. 5 illustrates an example method for selecting and transferring audio content to a media playback device in an appropriate format based on the media playback device's suitability for playing three-dimensional audio content.

FIG. 5 illustrates an example method 500 for selecting and transferring audio content to a media playback device in an appropriate format based on the media playback device's suitability for playing three-dimensional audio content.

The method 500 begins at a start operation and flow continues to operation 502 where a determination is made as to the geolocation of a media playback device such as media playback device 124 which is streaming or otherwise playing audio content from a media content application. In some examples, the geolocation of the media playback device, as well as the direction and rate of travel of that media playback device may also be determined. For example, the geolocation of the media playback device may be received at timed intervals, and those received geolocations may be time-stamped such a direction and rate of travel can be calculated by one or more server computing devices and/or the media playback device itself.

From operation 502 flow continues to operation 504 where a target venue for which promotional audio content is available (from a media streaming service that is being used by the media playback device) that is within a threshold distance of the media playback device is identified. In some examples, the target venue may be identified as being within a threshold distance of the media playback device based on the media playback device traveling in a direction relative to the target venue and/or at a rate in the direction of the target venue. For example, if the media playback device is determined to be traveling at a relatively fast rate of speed in the direction of the target venue, the threshold distance may be decreased. Alternatively, if the media playback device is determined to be traveling at a relatively slow rate of speed in the direction of the target venue, the threshold distance may be increased.

From operation 504 flow continues to operation 506 where a determination is made as to whether the playback device is suitable for 3D audio playback. According to some examples that determination is made based on determining whether the media playback device is connected to headphones, and is therefore capable of playing actual 3D audio content. In alternative examples that determination is made based on determining whether the media playback device is connected to one or more speakers that are capable of producing filtered audio content that may be perceived by a user as originating from a geographic location relative to the media playback device.

If at operation 506, a determination is made that the media playback device is suitable for 3D audio playback, and the media playback device is determined to be within a threshold distance of a target venue, flow continues to operation 508 where 3D audio content associated with the target venue is transferred to the media playback device.

From operation 508 flow continues to an end operation and the method 500 ends.

Alternatively, if at operation 506, a determination is made that the media playback device is not suitable for 3D audio playback, and the media playback device is determined to be within a threshold distance of a target venue, flow continues to operation 510 where non-3D audio content associated with the target venue is transferred to the media playback device.

From operation 510 flow continues to an end operation and the method 500 ends.

Figure 6:
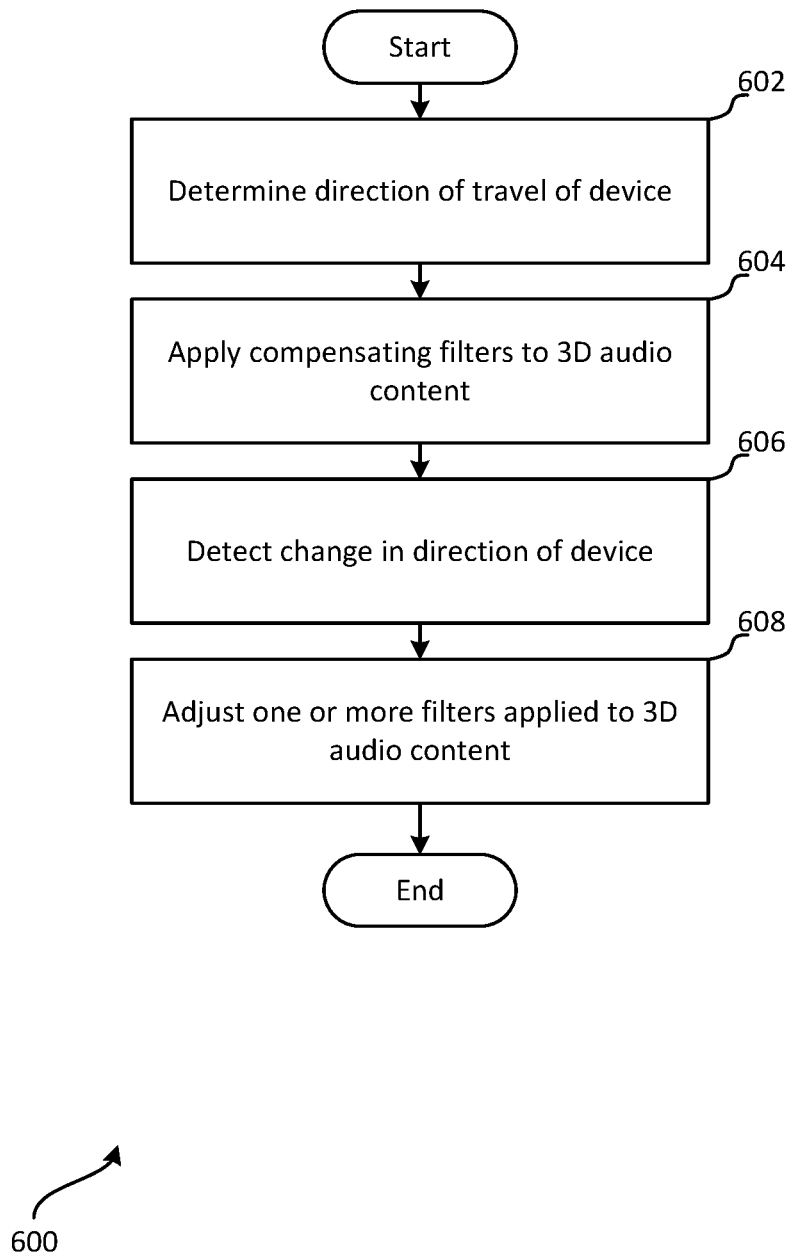
FIG. 6 illustrates an example method for adjusting one or more audio filters to compensate for a detected change in direction relative to a perceived geographic source of 3D audio content.

FIG. 6 illustrates an example method 600 for adjusting one or more audio filters to compensate for a detected change in direction relative to a perceived geographic source of 3D audio content.

The method 600 begins at a start operation and flow continues to operation 602 where a determination is made as to a direction of travel of a media playback device for which 3D audio content associated with a target venue is being transferred. According to examples, a plurality of geolocations corresponding to the geolocation of the media playback device may be received, and one or more time stamps may be associated with those received geolocations such that a direction of travel of the media playback device may be calculated and a rate of travel relative to a target venue may be calculated.

From operation 602 flow continues to operation 604 where one or more HRTF filters may be applied to 3D audio content that is, or has been, transferred to a media playback device. That is, one or more HRTF filters may be applied to the 3D audio content, based on one or more of: the location of the media playback device relative to the target venue, the direction of travel of the media playback device relative to the target venue, and/or the direction and rate of travel relative to the target venue, such that a user listening to the 3D audio content perceives the 3D audio content as originating from the target venue that the 3D audio content is associated with.

From operation 604 flow continues to operation 606 where a change in direction of the media playback device is detected. For example, one or more geolocations and/or associated timestamps may be received and a calculation may be made that the media playback device has changed its direction of travel relative to its previous course of travel. According to some examples a change in direction and/or a change in the rate of travel in a particular direction for the media playback device may be detected at operation 606.

From operation 606 flow continues to operation 608 where one or more HRTF filters may be automatically adjusted and applied to the 3D audio content associated with the target venue, based on the detected change in direction and/or rate of travel in a particular direction of the media playback device as it relates to the target venue such that a user listening to the 3D audio played back from the media playback device will perceive the 3D audio content as originating from the target venue.

From operation 608 flow continues to an end operation, and the method 600 ends.

Figure 7:
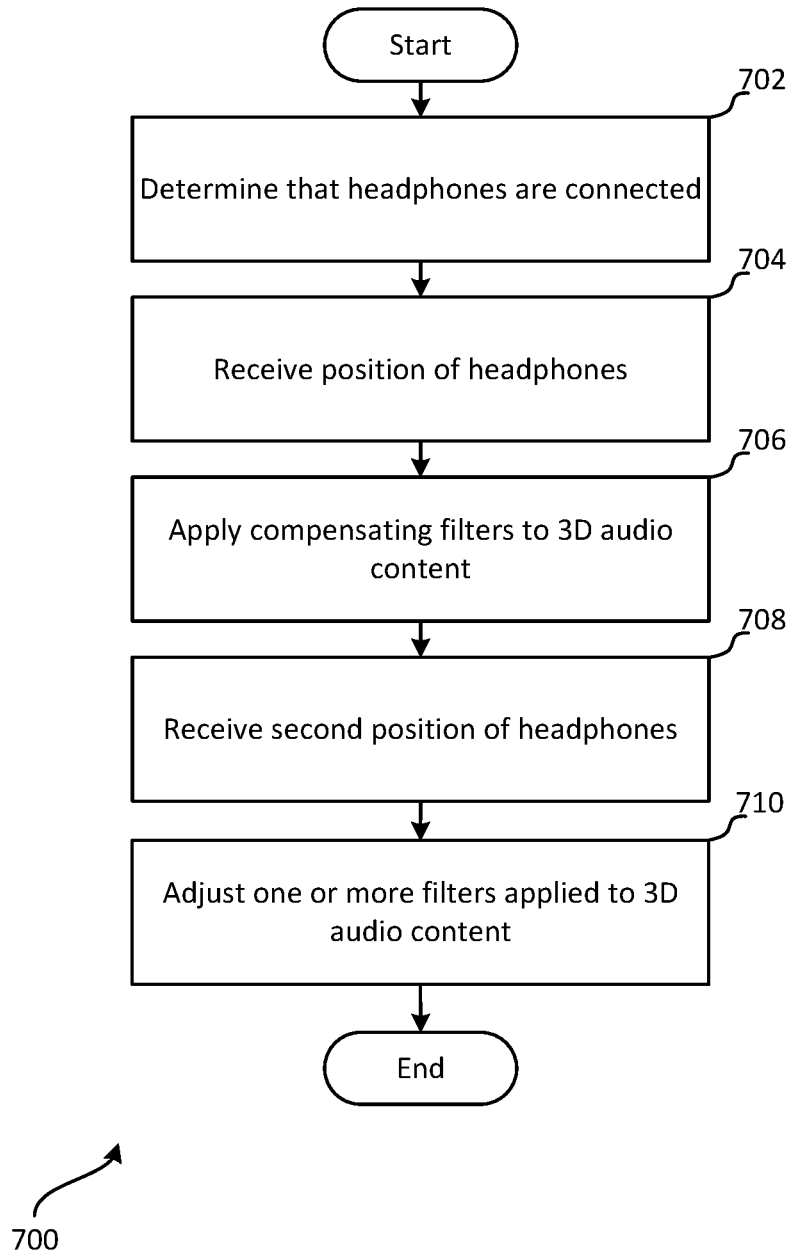
FIG. 7 illustrates an example method for adjusting one or more audio filters to compensate for a detected change in head movement relative to a perceived geographic source of 3D audio content.

FIG. 7 illustrates an example method 700 for adjusting one or more audio filters to compensate for a detected change in head movement relative to a perceived geographic source of 3D audio content.

The method 700 begins at a start operation and flow continues to operation 702 where a determination is made that headphones comprising one or more accelerometer are connected to a media playback device.

From operation 702 flow continues to operation 704 where a first position of the headphones is received. For example, a determination that the headphones are positioned in one or more directions relative to a target venue for which 3D audio content is being, or has been, transferred to the media playback device may be made based on calculations associated with data received from the one or more accelerometers comprised within the headphones.

From operation 704 flow continues to operation 706 where one or more HRTF filters are applied to the 3D audio content associated with the target venue such that a user listening to that 3D audio content will perceive the 3D audio content as originating from the target venue.

From operation 706 flow continues to operation 708 where a second position of the headphones is received, and the second position is determined to be different from the first position of the headphones. For example, a determination may be made that the headphones are now positioned in one or more different directions relative to the target venue than they were in the first position.

From operation 708 flow continues to operation 710 where one or more HRTF filters applied to the 3D audio content associated with the target venue are automatically adjusted, based on the determined change in location of the headphones relative to the target venue, such that a user listening to the 3D audio content will perceive the 3D audio content as originating from the target venue despite the headphones moving relative to the target venue (i.e., despite the user's head moving relative to the target venue).

From operation 710 flow continues to an end operation and the method 700 ends.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for providing media content to a media playback device, the method comprising:
   determining a first geolocation of the media playback device;
   determining a direction of travel for the media playback device;
   determining a rate of travel for the media playback device;
   identifying a target venue;
   determining if the media playback device is suitable for playback of audio; and
   when the media playback device is suitable for playback of audio, transferring, to the media playback device, media content associated with the target venue in a three-dimensional (3D) audio format.

2. The method of claim 1, further comprising: receiving two or more geolocations, the geolocation comprising a timestamp, wherein the rate of travel is calculated based on a distance traveled between two geolocations divided by a time difference between timestamps.

3. The method of claim 1, further comprising:
   determining a location of the target venue;
   determining a threshold distance from the target venue; and
   determining if the first geolocation is within the threshold distance.

4. The method of claim 3, further comprising: altering the threshold distance based on the direction of travel or the rate of travel.

5. The method of claim 3, when the media playback device is both within the threshold distance and is suitable for playback of audio, transferring, to the media playback device, media content associated with the target venue.

6. The method of claim 3, when the media playback device is within the threshold distance but is not suitable for playback of 3D audio, transferring, to the media playback device, media content in a non-3D audio format.

7. The method of claim 3, wherein determining if the media playback device is suitable for playback of audio comprises determining if the media playback device is connected to a speaker and determining if the speaker is capable of producing filtered audio content.

8. The method of claim 1, further comprising adjusting the media content based at least in part on one or more of the direction of travel or the rate of travel.

9. The method of claim 8, wherein adjusting the media content based at least in part on one or more of the direction of travel or the rate of travel comprises applying a head-related transfer function filter to the media content in the 3D audio format.

10. A media server comprising:
    a database storing a plurality of songs in both a three-dimensional (3D) format and a non-3D format;
    a processing device in data communication with the database; and
    a computer readable storage device storing instructions that, when executed by the processing device, cause the media server to:
    determining a first geolocation of the media playback device;
    determine a direction of travel for the media playback device;
    determine a rate of travel for the media playback device;
    identifying a target venue;
    determining if the media playback device is suitable for playback of audio; and
    when the media playback device is suitable for playback of audio, transferring, to the media playback device, media content associated with the target venue in a three-dimensional (3D) audio format.

11. The media server of claim 10, wherein the computer readable storage device stores further instructions that, when executed by the processing device, cause the media server to:
    determine a location of the target venue;
    determine a threshold distance from the target venue; and
    determine if the first geolocation is within the threshold distance.

12. The media server of claim 11, wherein the computer readable storage device stores further instructions that, when executed by the processing device, cause the media server to: when the media playback device is both within the threshold distance and is suitable for playback of audio, transfer, to the media playback device, media content associated with the target venue.

13. The media server of claim 12, wherein the computer readable storage device stores further instructions that, when executed by the processing device, cause the media server to: when the media playback device is within the threshold distance but is not suitable for playback of 3D audio, transfer, to the media playback device, media content in a non-3D audio format.

14. The media server of claim 13, wherein determining if the media playback device is suitable for playback of audio comprises determining if the media playback device is connected to a speaker and determining if the speaker is capable of producing filtered audio content.

15. The media server of claim 10, wherein the computer readable storage device stores further instructions that, when executed by the processing device, cause the media server to adjust the media content based at least in part on one or more of the direction of travel or the rate of travel.

16. The media server of claim 15, wherein adjusting the media content based at least in part on one or more of the direction of travel or the rate of travel comprises applying a head-related transfer function filter to the media content in the 3D audio format.

17. A media playback device comprising:
a processing device; and
at least one non-transitory computer readable storage device storing instructions that when executed by the processing device, cause the media playback device to:
provide, to the media server, a geolocation of the media playback device;
provide, to the media server, a direction of travel and a rate of travel of the media playback device;
provide, to the media server, a capability of the media playback device to play three-dimensional (3D) audio content; and
when the media playback device is capable of playing 3D audio content, play back media content received from the media server, wherein the media content comprises 3D audio content, and wherein the media content is associated with a target location that is within a threshold distance of the media playback device.

18. The media playback device of claim 17, when the media playback device is within the threshold distance but is not suitable for playback of audio, play media content in a non-3D audio format.

19. The media playback device of claim 17, wherein the geolocation comprises a timestamp, wherein a rate of travel is calculated based on a distance traveled between geolocations divided by the time difference between timestamps.

20. The media playback device of claim 17, wherein the 3D audio content is adjusted based at least in part on one or more of the direction of travel or the rate of travel.

\* \* \* \* \*